May 14, 1929.  F. M. SMALL  1,712,588
VEHICLE DOOR
Filed Feb. 18, 1927  2 Sheets-Sheet 1

INVENTOR.
Frederick M. Small
BY
Bacon & Thomas
ATTORNEYS

May 14, 1929.  F. M. SMALL  1,712,588
VEHICLE DOOR
Filed Feb. 18, 1927   2 Sheets-Sheet 2
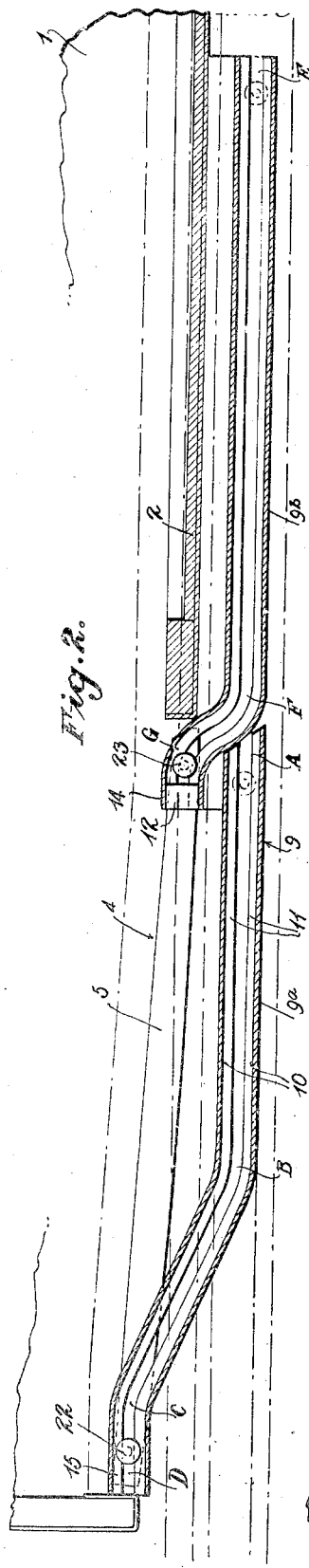
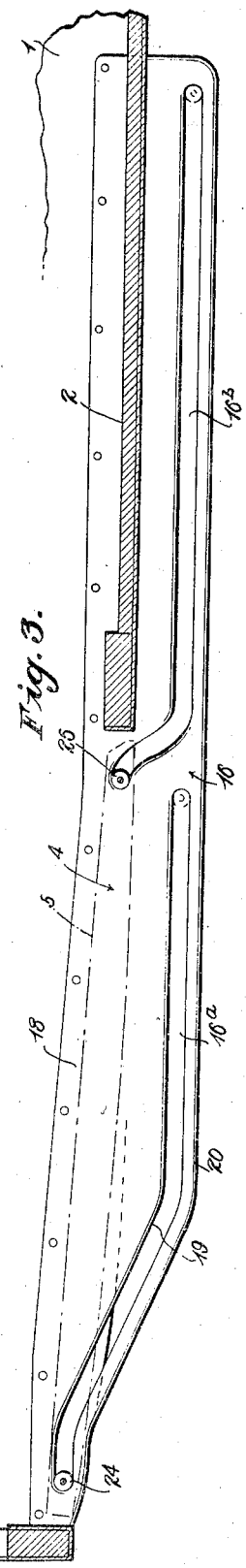
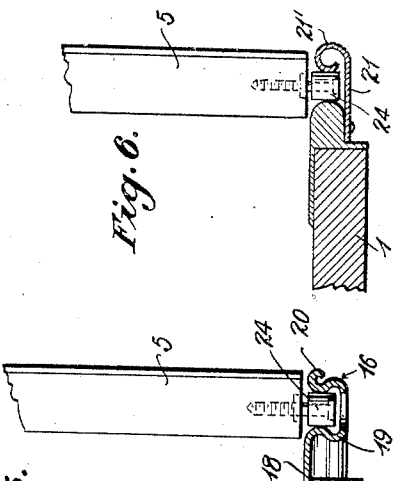
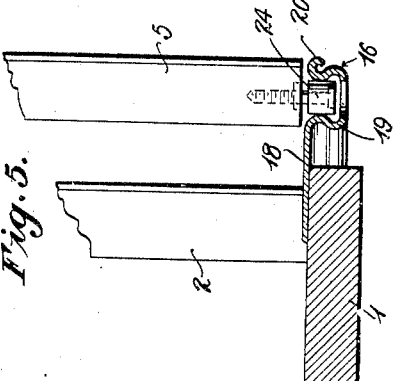
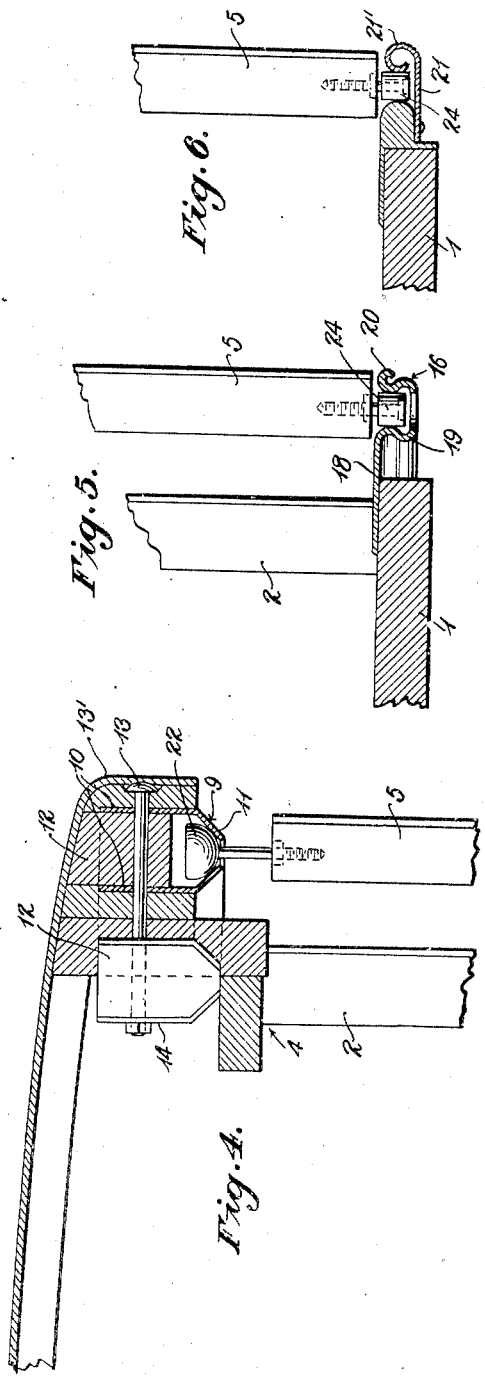
INVENTOR.
Frederick M. Small
BY Bacon & Thomas
ATTORNEYS Patented May 14, 1929.

1,712,588

UNITED STATES PATENT OFFICE.

FREDERICK M. SMALL, OF YORK, PENNSYLVANIA, ASSIGNOR TO MARTIN-PARRY CORPORATION, OF YORK, PENNSYLVANIA, A CORPORATION OF DELAWARE.

VEHICLE DOOR.

Application filed February 18, 1927. Serial No. 169,320.

The invention relates to improvements in sliding doors for automobile bodies of the commercial or delivery type.

In its broader aspects the invention comprehends a vehicle body having a door opening at one side of the driver's seat, and a sliding door for said opening, the forward and rear ends of which are adapted to shift laterally as the door approaches a closed position so that it will lie substantially flush with the side panel of the body and the windshield frame when in such position, and to also move laterally during its initial opening movement to move the door out of alignment with the panel so that it is free to continue its movement in a plane parallel with the panel.

From a more specific aspect, the invention embodies novel supporting and guiding tracks by which the above objects are accomplished and which tracks coact with the front and rear portions of the door to positively shift the door inwardly when it approaches a closed position, so that when in its closed position it is flush with the side panel and to likewise positively shift the door outwardly during the initial portion of its opening movement to cause the door during said initial opening movement to move out of alignment with the panel whereby on its continued opening movement the door travels on a plane parallel with the panel. The tracks or guides for the door are so constructed, that during the closing movement of the door the front end thereof is gradually moved in line with the windshield panel, after which the rear end of the door is rapidly thrown inwardly in line with the side panel so that the door in its entirety lies flush with said panel. Conversely, the guides upon the initial opening movement of the door rapidly move the rear end of the door laterally, while the front end of the door is shifted laterally less abruptly until the door in its entirety is offset relative to the panel whereupon during its continued rearward movement the door moves parallel with the panel.

In the accompanying drawings Figure 1 represents a side elevation of a portion of the commercial body.

Figure 2 is a view of the upper track or guide system for the door.

Figure 3 is a detail view of the lower track system.

Figure 4 is a detail sectional view of the upper trackage arrangement.

Figure 5 is a detail sectional view of the lower trackage system.

Figure 6 is a detail showing of a modified form of lower trackage construction.

Figure 1:
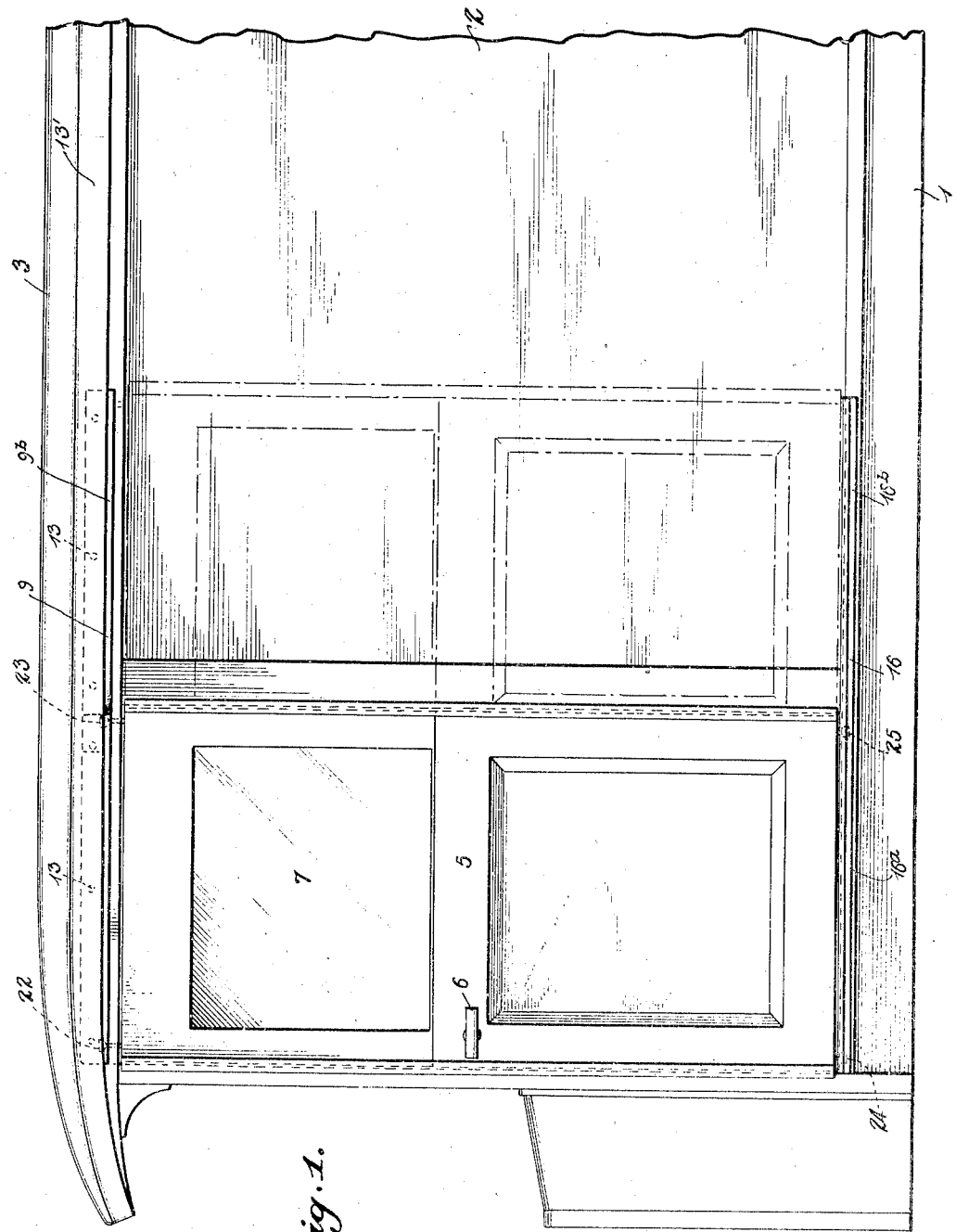

Referring now more particularly to the drawings, wherein like reference characters indicate corresponding parts, the numeral 1 designates a vehicle body of the type generally referred to as a delivery or commercial body. The body is provided with side panels 2, a top 3, and a driver's seat is located in the rear of the windshield frame 3', there being a door receiving opening 4 between the windshield frame and the forward edge of the panel 2. A sliding door 5 is provided for opening and closing this door opening 4, enabling the driver to freely leave the car or gain access to the driver's seat thereof. The door 5 is capable of a sliding movement so that it may occupy either the full line position or the dotted line position shown in Figure 1. This door may be of the usual construction having a suitable hand operated latch for holding it in a closed position, and may be likewise provided with a glass panel 7 which may be raised or lowered for the purposes of ventilation.

The door 5 is mounted for a sliding movement, the tracks upon which the door slides being so arranged that in addition to sliding horizontally this door also shifts laterally for purposes which will hereinafter appear. To mount the door whereby such movement is permitted an upper track system 9 is provided which may be said to comprise two sections or portions $9^a$ and $9^b$. The trackway is composed of a pair of plates 10 having their lower ends 11 bent inwardly and spaced apart by the spacer blocks 12, as shown in Figure 4. These plates are retained in position by fastening bolts 13 passing through portions of the vehicle body, a shielding plate 14' of metal or the like also being provided for giving the interior of the body a sightly appearance.

The front section $9^a$ of the track system, while constructed of the same metallic plates as the section $9^b$ is, however, of a substantially different configuration, or these plates are bent to represent a very different contour. The forward portion or section $9^a$ from the point A to the point B provides a trackway extending in a substantially longitudinal plane, while the trackway from the point B to the point C is directed inwardly at a substantial angle, and from the point C to the point D extends forwardly in a substantially longitudinal direction to the corner post of the windshield. The track section 9<sup>b</sup> from the point E to the point F which constitutes the major portion of this section, extends in a substantially horizontal plane in line with that portion of the forward track section 9<sup>a</sup> that lies between the reference characters A and B. However, from the point F the track section 9<sup>b</sup> extends inwardly at a very abrupt angle to the point G, terminating as indicated by the reference character 14 where this trackway is in a slightly offset position with respect to the portion 15 of the trackway 9<sup>a</sup> lying between the reference characters D and C thereof. It will be noted by reference to Figure 2 that the door 5 when in its closed position converges inwardly with respect to the windshield due to the fact that the forward end of the front track 9 extends inwardly a greater distance than the acutely curved track extremity G. In other words, the forward track portions, in addition to being of differential curvature, for the purpose stated, are of differential depths to thereby incline the forward end of the door abutting the windshield with respect to the rear end thereof positioned in proximity to the panel 2. It is of utmost importance that the track system follow this contour as this causes the sliding door during its initial opening movement to have its rear end shifted outwardly at a most substantial angle, while during the initial movement of the forward end of the door said door progressively moves outwardly at a substantially less abrupt angle. Conversely upon the closing of the door its forward end moves inwardly progressively during its sliding movement at a slight angle until it is in line with the corner post whereupon the rear end of the door is abruptly thrown inwardly so as to lie flush with the panel 2 of the body.

The lower track system need not be discussed in detail, as such system is of the same contour as the upper system 9. The lower system 16 embodies a forward section 16<sup>a</sup> and a rear section 16<sup>b</sup>. These sections lie in the vertical plane of the sections 9<sup>a</sup> and 9<sup>b</sup> respectively of the upper track-way system. However, such sections differ in construction, in that the lower system is composed of a piece of metal 18 bent to provide the track 19, which track has an outside 20 so curved as to resiliently engage a stud or roller to be later described, which is carried by the door. In Figure 6 a slightly modified form is shown, wherein a strip 21 of metal is provided having a rebent end 21' which exerts a resilient influence on the door stud.

To mount the door on the track system the upper portion of the door at its front end carries a supporting ball 22 which engages the flanges 11 of the portion 9<sup>a</sup> of the track system 9. The rear of the door carries a similar ball 23 which engages the flanges of the rear section 9<sup>b</sup> of the trackway 9. Similarly, the bottom of the door at its forward end carries a roller 24 riding in the trackway 19 formed in the section 16<sup>a</sup> of the track system 16, while the rear lower end of the door has a similar roller 25 riding in the lower trackway section 16<sup>b</sup>.

From this construction it will be apparent that the door is supported at its upper and lower sides in a firm manner for a sliding movement, and that during this sliding movement the door is shifted laterally inwardly or outwardly, depending upon its direction of movement so that when in an open position it is offset relative to the panel 2 and lies substantially parallel therewith, while in a closed position it is coextensive with this panel or in substantial alignment with the front edge thereof. This movement of the door may be briefly explained as follows: Assuming the door is closed, as shown in full lines in Figure 2, the initial rearward movement thereof causes the rear end of the door to shift outwardly at a substantial angle because the upper ball or support 23 and the lower support or ball 25 riding in the track sections 9<sup>b</sup> and 16<sup>b</sup> respectively positively deflect the door simultaneously with its rearward sliding movement, which deflection continues until the ball 23 reaches the point F in the trackway 9<sup>b</sup>. During the initial movement of the door or at least as soon as the forward ball 22 reaches the point C in the upper trackway 9<sup>a</sup> the forward end of the door is then deflected outwardly, which continues during its rearward sliding movement until this supporting ball reaches the point B in the trackway 9<sup>a</sup>, at which time the entire door lies in a substantially longitudinal plane offset relative to the panel 2 and during its continued sliding movement it moves parallel with the panel 2 occupying when open the position shown in dotted lines in Figure 2.

To close the door it is advanced forwardly in a longitudinal plane parallel to the panel 2 until the lower supporting roll 24 and the upper supporting ball 22 at the forward end of the door reach the point B in the section of the trackway 9<sup>a</sup> and a similar point in the section 16<sup>a</sup> of the lower trackway 16. A continued movement of the door causes the front end to be gradually deflected inwardly until the upper and lower supporting balls or rollers 22 and 24 respectively reach the part C of the upper trackway section 9<sup>a</sup> and a similar part in the lower trackway section 16<sup>a</sup> at which time the front end of the door is substantially in alignment with the panel 2. The continued forward movement of the door causes the rear supporting ball 23 at the upper end of the door and the lower supporting ball 25 to be shifted at a very abrupt angle by the section of the trackway existing between the reference characters F and G in the portion 9ᵇ of the trackway 9 and a similarly curved section in the trackway section 16ᵇ of the lower trackway 16. From the foregoing it will be apparent that when the door is in a closed position it lies flush with the side panel offering no unsightly projecting or protruding part, while when the door is in an open position it is disposed parallel with the side panel. The sliding and lateral movement of the door is positively controlled so that during a portion of its movement in either a forward or rearward direction the door progressively moves in and out under the influence of the trackways, while it is sliding backward or forward. The inward or outward movement of the door is, as before stated, progressive and occurs simultaneously with a portion of the sliding movement thereof.

I have shown the preferred form of my invention in this application, but it will be understood that the trackways may be modified in various respects without departing from the spirit of this invention.

Having thus described my invention, what I claim is:

1. The combination of a motor vehicle body having a side panel, a door opening at one end of the panel, a sliding door for said opening, a track supporting and guiding system for said door comprising guiding devices connected with the door and cooperating with the track system and being slidably movable with respect thereto, said track system having angular portions of differential curvature and depths, whereby as the door approaches a closed position it is first deflected inwardly and when it nears its closed position the rear end of the door is abruptly moved laterally to bring the door substantially flush with the panel and to maintain it in a converging position with respect to the panel.

2. The combination of a motor vehicle body having a side panel and being provided with a door opening at one end of the panel, a sliding door for said opening, a track supporting and guiding system for said door, guiding devices connected with the door and cooperating with the track system and being slidably movable with respect thereto, said track system having angular inwardly extending portions of differential curvature whereby as the door approaches a closed position it is first deflected inwardly and when it nears its closed position the rear end of the door is abruptly moved laterally to bring the door substantially flush with the panel, the forward of said angular portions of said track system being of a greater depth than the other of said angular portions whereby to position the door convergingly at its front end with respect to the panel.

3. The combination of a motor vehicle having a side panel and a door opening at one end of the panel, a slidable door for said opening, a track supporting and guiding system for the door comprising forward and rear track portions, guiding devices connected with the door and cooperating with the track system and being slidably movable with respect thereto, said track system having inwardly extending angular portions of differential curvature at their front ends whereby as the door approaches a closed position it is first deflected gradually inwardly and when it nears its closed position the rear end of the door is abruptly moved inwardly to bring the door substantially flush with the panel, one of said angular portions of the track system extending inwardly a greater distance than the other angular portion to maintain the door in a converging position with respect to the panel when in its closed condition.

4. The combination of a motor vehicle body having a side panel, a door opening provided at one end of the panel, a sliding door for said opening, a track supporting and guiding system for the door, guiding devices connected with the door and cooperating with said track supporting and guiding system and being slidably movable with respect thereto, said track system having angular inwardly extending portions of different curvature and terminating in a substantially longitudinal direction with respect to the corner post of the windshield provided by said motor vehicle, said angular portions being longitudinally offset with respect to one another and the forward of said portions extending inwardly a greater distance than the rearward portion whereby to convergingly dispose the door when in closed position.

5. The combination of a motor vehicle body having a side panel, a door opening at one end of the panel, a sliding door for said opening, a track supporting and guiding system for said door, guiding devices connected with the door and cooperating with the track supporting and guiding system and being slidably movable with respect thereto, said track system having angular inwardly extending portions of differential curvature whereby as the door approaches a closed position it is first gradually deflected inwardly and when it nears its closed position the rear end of the door is abruptly moved laterally to bring the same substantially flush with the panel, said track supporting and guiding system being made of inherently resilient material and yieldably engaging the guiding devices of the door to prevent accidental sliding movement thereof in any condition of adjustment of the door.

6. The combination with a motor vehicle body having a side panel, a windshield post, said panel being provided with an opening at the front of the body, a sliding door for said opening, a trackage system for said door terminating in close proximity to the windshield post, said motor vehicle body having an overhanging top, said trackage system located beneath said top and within the vertical plane of the edge thereof, guiding devices connected with the door and cooperating with the trackage system and being slidably movable with respect thereto, said trackage system having angularly disposed inwardly extending portions of different curvature whereby as the door approaches a closed position it is first gradually deflected inwardly towards said windshield post and when it nears its closed position the rear end of the door is abruptly moved laterally to bring the same substantially flush with the panel of the vehicle body.

7. The combination with a motor vehicle body having a side panel and provided with an opening at its forward end, a windshield post and a vehicle top, a sliding door for said opening, a trackage system secured to said top and within the vertical plane of the edge thereof, said trackage system being provided with guiding portions of differential curvature, the rear portion being of a more abrupt curvature than the forward portion thereof, devices connected with the door and cooperating with the trackage system and being slidably movable with respect thereto, the differential curvature of the trackage system effecting a gradual inward movement of the door as it is moved forwardly into proximity to said windshield post and when it nears its closed position effecting the abrupt lateral inward movement of the rear portion of the door to thereby bring the door in substantially flush position with respect to the panel.

8. The combination with a motor vehicle body provided with a side panel, a windshield post, the side panel having a door opening in the forward portion of the body, a sliding door for said opening, a top, a trackage supporting and guiding system for the door secured to the top and located within the vertical plane of the side edge thereof to thereby substantially conceal the trackage system, guiding devices connected with the door and cooperating with the trackage system, said trackage system having angular inwardly extending portions of different curvature and terminating in a substantially longitudinal direction whereby the door when moved forwardly is caused to gradually move inwardly and when it approaches a closed position is moved laterally abruptly to bring the same substantially flush with the side panel of the vehicle body.

9. A vehicle body for motor vehicles comprising a side paneling provided with an opening at the front thereof for a movable door, a windshield post, and a top, a trackage system for said movable door, said trackage system being secured to said top and substantially concealed by the edge thereof and provided with guiding portions of differential curvature at the front and rear thereof respectively, devices associated with said door for cooperating with said trackage system whereby to urge the front portion of the door gradually inwardly as it is pushed forwardly towards said windshield and abruptly inwardly at its rear end as it approaches closed position whereby to place the door in a position substantially flush with the side panels.

10. A vehicle body for motor vehicles comprising a side paneling provided with an opening at the front thereof for a movable door, a windshield post, and a top, a trackage system for said movable door, said trackage system being secured to said top and substantially concealed by the edge thereof and provided with guiding portions of differential curvature at the front and rear thereof respectively, devices associated with said door for cooperating with said trackage system whereby to urge the front portion of the door gradually inwardly as it is pushed forwardly towards said windshield and abruptly inwardly at its rear end as it approaches closed position whereby to place the door in a position substantially flush with the side panels, and a lower trackage system of complemental shape and devices associated with the lower portion of the door cooperating therewith.

11. A motor vehicle body having a side paneling and an opening at the front portion thereof for receiving a sliding door, a windshield post, a trackage system for guiding said sliding door, a top, said trackage system being located within the vertical plane of the edge of the top and substantially concealed thereby and the forward portion of the trackage system terminating in close proximity to the windshield post, devices secured to the slidable door cooperating with the trackage system, the trackage system including guiding portions of differential curvature for causing the front portion of the door to be moved gradually inwardly with respect to the windshield post and the rear portion of the door to be moved abruptly laterally to thereby automatically guide the door into a position in which the side lies substantially flush with the vehicle panel.

12. A vehicle body of the character described comprising a side panel and an opening provided at the forward portion of the body for receiving a sliding door, a top, a spacer block associated with the top and having secured on opposite sides thereof plates shaped to constitute a trackage system, said trackage system being located within the overhanging portion of the top and substantially concealed thereby and provided with an inwardly extending angular portion terminating in proximity to the windshield post and an inwardly extending angular portion at the rear of the opening of a more abrupt configuration, a sliding door having devices cooperating with the trackage system to move the door gradually inwardly at its front portion and abruptly inwardly at its rear portion and maintain it substantially flush with the side panel of the automobile body.

13. A vehicle body of the character described comprising a side paneling having an opening at its forward end for receiving a sliding door, a windshield post and a top, a trackage system secured to said top and located within the vertical plane of the edge thereof and provided with angular portions of differential curvature, the forward portion of the top terminating in close proximity to the windshield post, a sliding door having devices cooperating with the trackage system and adapted to be moved gradually inwardly at the front portion thereof and abruptly inwardly at the rear portion thereof when advanced, thereby to place the door in a position substantially flush with the panel, a lower trackage system having substantially complemental angular portions, said lower trackage system being secured to the floor of the vehicle body and supported thereby.

14. The combination with a motor vehicle body having a side panel, a door opening at one end of the panel, a windshield post, a sliding door for said opening, a track supporting the guiding system for said door, a top for the motor vehicle, said track supporting and guiding system being located within the vertical plane of the top, and provided with upper and lower forward and rear track portions, each front and rear portion for a portion of its length lying in aligned longitudinal plane, the forward track portions being thence turned inwardly relative to the panel and forwardly in substantial alignment with the panel and terminating in proximity to said windshield post while the forward ends of the rear track portions extend inwardly at a point adjacent the door opening at an angle substantially greater than the angle of the inward extensions of the forward portions of said upper and lower track system.

15. The combination with a motor vehicle body having a side panel, a door opening therefor, a sliding door for said opening, a windshield post, supporting elements near the front and rear side of the door, a trackage system with which said supporting elements slidably cooperate, said trackage system comprising a rear portion extending for a substantial portion of its length in a plane parallel to the plane of the body and thence extending inwardly at a substantial angle, the front portion of the trackage also having a substantial part thereof extending longitudinally of the body, and thence extending inwardly at an angle substantially less than the angle of the inwardly extending part of the rear portion of the trackage, and said trackage system being disposed within a vertical plane of the top of the motor vehicle body.

16. A motor vehicle body having a panel, a door opening at the forward portion thereof, a windshield post and an overhanging top, a sliding door for said opening, an upper trackage system comprising front and rear trackage portions, guiding devices connected with the door for slidable engagement with the trackage system, one of the guiding devices engaging the front portion of the trackage system and the other the rear portion thereof, said portions of the trackage system each having a longitudinal extending part offset with reference to the panel and inwardly angular extending portions near the forward ends thereof, the angular extension of the front portion being substantially less acute than the angular extension of the rear portion, said trackage system being located within the vertical plane of the overhanging top.

In testimony whereof I affix my signature.

FREDERICK M. SMALL.